United States Patent [19]

Cavallerano et al.

[11] Patent Number: 4,984,067
[45] Date of Patent: Jan. 8, 1991

[54] HDNTSC SIGNAL TRANSMISSION AND RECEPTION WITH TIME AND FREQUENCY MULTIPLEXING

[75] Inventors: Alan P. Cavallerano, Ossining; Carlo Basile, Flushing; Mikhail Tsinberg, Riverdale, all of N.Y.

[73] Assignee: North American Philips Corporation, New York, N.Y.

[21] Appl. No.: 239,091

[22] Filed: Aug. 31, 1988

[51] Int. Cl.⁵ .............................................. H04N 11/06
[52] U.S. Cl. ....................................... 358/12; 358/141
[58] Field of Search ................... 358/11, 12, 140, 141, 358/145, 142, 146

[56] References Cited

U.S. PATENT DOCUMENTS

| 4,661,850 | 4/1987 | Strolle et al. | 358/140 |
| 4,665,427 | 5/1987 | Beckley et al. | 358/143 |
| 4,748,496 | 5/1988 | Drury et al. | 358/12 |

Primary Examiner—James J. Groody
Assistant Examiner—David E. Harvey
Attorney, Agent, or Firm—Michael E. Marion

[57] ABSTRACT

A high definition television augmentation channel which provides an efficient use of bandwidth, time expands line differential, panel, and luminance signals. The time expanded line differential signals are arranged in time coincidence and quadrature modulated, as are the corresponding segments of the panel signals. The quadrature modulations providing signals in a common frequency band. Luminance signals are converted to the common frequency band and time multiplexing of the three signals is performed. The resulting time multiplexed signal is then frequency multiplexed with the DSS signals which have been frequency converted to occupy a frequency band contiguous with the common frequency band.

17 Claims, 5 Drawing Sheets

FIG. 2

| COMPONENTS | ORIGINAL TIMEBASE & BASE BANDWIDTH | EXPANSION FACTOR | TIMEBASE & BASE BANDWIDTH |
|---|---|---|---|
| LD2 | 26 μSEC<br>3 MHz | 12:19 | 41.17 μSEC<br>1.89 MHz |
| LD4 | 26 μSEC<br>3 MHz | 12:19 | 41.17 μSEC<br>1.89 MHz |
| Yh | 26 μSEC<br>5.6 MHz | 2:3 | 39.00 μSEC<br>3.73 MHz |
| NTSC PL1 & PR1 | 19.2 μSEC<br>4.2 MHz | 9:20 | 42.67 μSEC<br>1.89 MHz |
| NTSC PL3 & PR3 | 19.2 μSEC<br>4.2 MHz | 9:20 | 42.67 μSEC<br>1.89 MHz |
| DSS | 127.11 μSEC<br>440 Kbps | QPSK | 127.11 μSEC<br>0.22 MHz<br>(total bandwidth) |

HDNTSC SIGNAL TRANSMISSION AND RECEPTION WITH TIME AND FREQUENCY MULTIPLEXING

BACKGROUND OF THE INVENTION

1. Field of the Invention

The invention pertains to television information transmission and reception and more particularly to the transmission and reception of high definition television signals comprising augmentation panels to the left and right of a NTSC compatible center panel, high frequency luminance, and stereo high fidelity audio.

2. Description of the Prior Art

Conventional NTSC color television systems transmit picture information at a rate of 59.94 picture fields per second, two constituting a frame, each frame consisting of 525 horizontal scan lines. To reduce the transmission and reception bandwidths required to reproduce the transmitted picture, these horizontal scan lines are interlaced from field-to-field with a ratio of two-to-one, that is only every other scan line is transmitted in each field. Scan lines omitted in one field are transmitted in the next succeeding field, thus all the odd numbered fields contain one set of scan lines and the even numbered fields contain the set of scan lines which interlace with the scan lines in the odd numbered fields. This arrangement permits the transmission, reception, and picture reproduction at bandwidths reduced from that required for every scan line to be transmitted in each frame.

Television pictures reproduced in these conventional systems have aspect ratio of four to three, i.e. for every four units of horizontal width there are three units of vertical height. High definition television (HDTV) systems may utilize TV screens with aspect ratios that are increased from the conventional 4:3 to aspect ratios of 16:9 and transmit information for an entire image frame without field interlacing, thus providing improved picture resolution. To maintain compatibility with existing TV receivers the wide aspect ratio HDTV source picture is divided into three panels, the center panel comprising the conventional aspect ratio TV picture and the augmentation information for the wide aspect ratio HDTV display at a receiver augmentation for HDTV contained in the panels on the left and right of this center panel. The augmentation signals for providing the left and right panels are transmitted separately from the conventional TV signals. These signals are combined in the HDTV receiver, while the augmentation signals are ignored by the conventional receivers. Additionally, sound quality is improved with the transmission of digital stereo audio of compact disc quality.

Techniques for providing HDTV-NTSC compatible television signals and augmentation signals are disclosed in U.S. patent application Ser. No. 057,847 filed June 2, 1987; Ser. No. 057,849 filed June 2, 1987; Ser. No. 122,148 filed Nov. 17, 1987; and Ser. No. 084,968 filed Aug. 13, 1987. All these applications are assigned to the assignee of the present invention and are incorporated herein by reference.

In addition to the information for extending the picture width, the augmentation signals include information for providing improved resolution by transmitting a line differential signal, and a high frequency luminance component. As previously configured, these transmissions required a channel bandwidth of 6 MHz. It is the purpose of this invention to provide a system that transmits the augmentation information within a 4 MHz channel.

SUMMARY OF THE INVENTION

In accordance with the principles of the present invention HDTV signals, compatible with NTSC receivers, are provided with an efficient use of bandwidth so that the augmentation information, digital stereo audio, and digital synchronization may be transmitted within a 4 MHz bandwidth. This is accomplished by quadrature modulating left and right panel, time expanded signals in a four line cycle appropriately delayed for corresponding segments to be time coincident; time multiplexing the quadrature modulated panel signals with second and fourth line differential signals of the four line cycle, time expanded, appropriately delayed to be time coincident, and quadrature modulated on the same subcarrier utilized for the panel signals; heterodyning the high frequency luminance signal (Yh) of one line in the four line cycle with a signal at a frequency chosen to establish a sideband that coincides with the frequency band allocated to the quadrature modulations, and time multiplexing this sideband with the quadrature modulated panel signals. Digital stereo audio of compact disc quality and digital synchronization (DSS) signal are heterodyned with a signal at a frequency which permits the sidebands of the heterodyning process to be frequency multiplexed with the quadrature modulated and Yh components within the desired 4 MHz band. The composite 4 MHz band is translated to the RF channel to amplitude modulate the picture carrier signal, wherein the carrier may be suppressed.

Since quadrature modulation is used only for signals which are highly correlated, quadrature errors only establish static errors at DC and slightly distort signals with sharp vertical transitions. Accurate quadrature demodulation and precise phase recovery at the receiver may be accomplished with the DSS packet cooperating with pilot bursts of the carriers and the vertical interval training signals (VITS), described in the incorporated patent applications.

BRIEF DESCRIPTION OF THE DRAWINGS

FIG. 2 is a component tabulation of time and frequency allocations for a 4 MHz augmentation channel.

DESCRIPTION OF THE PREFERRED EMBODIMENTS

Figure 1:
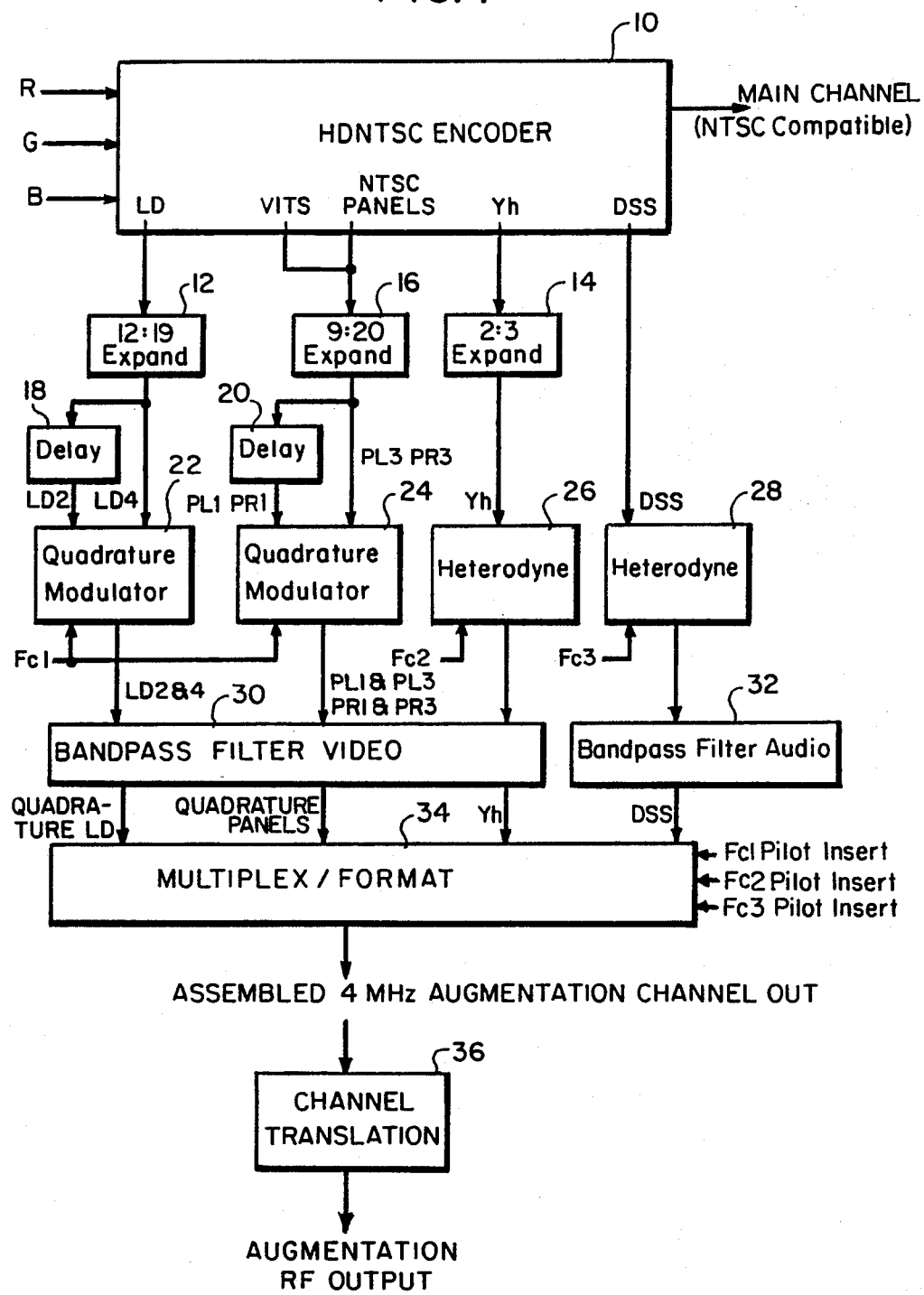
FIG. 1 is a block diagram a HDNTSC encoder with a 4 MHz augmentation channel.

Referring to FIG. 1, a HDNTSC encoder 10, as described in the incorporated patent applications, provides a superline which contains line differential (LD) signals, left and right panel augmentation signals, high frequency luminance signals, and a VITS (vertical interval test signal, all extracted from a sequence of four source lines. Though the source indicated in the figure is RGB, it should be recognized that an HDMAC-60 source may also be utilized. Each super line contains two line differential signals (LD2 and LD4), the segment of the first line in the left panel (PL1), the segment of the first line in the right panel (PR1), the segment of the third line in the left panel (PL3) and the segment of the third line in the right panel (PR3), and a luminance signal Yh. Pan and scan techniques, described in the incorporated applications, permit the NTSC panel to be positioned anywhere within the confines of the overall 16:9 aspect ratio image, causing the left and right panels to vary, though the percentage of the overall image in these two panels remains constant.

LD2 is established by subtracting one half the sum of the first and third lines from the second line, while LD4 is established by subtracting one-half the sum of the third line and the first line in the next cycle from the fourth line. These LD signals have adjacent time slots on the super line and are provided at the LD output terminal of the encoder 10. Panel signals are extracted from the original line in the time sequence PL1 (first)/PR1/PL3/PR3(last). The luminance signal Yh is provided by vertically decimating the high frequency luminance information in a manner which selects one source line in each cycle. In this way the diagonal resolution is limited, but tailored well to the human visual system.

Video signals from the HDNTSC encoder 10 are time expanded to reduce signal bandwidth prior to further processing. The LD signals and Yh signals are time expanded by factors of 12:19 and 2:3 in expansion circuits 12 and 14, respectively, while the left and right panel signals with the baseband VITS are time expanded by a factor of 9:20 in expansion circuit 16. The original time base and base bandwidth of the signals provided by the HDNTSC encoder 10 and the time base and base bandwidth established by these time expansions are shown in FIG. 2. These expansion factors achieve a signal-to-noise ratio improvement for the received picture over that provided by the prior art and reduce the impact of channel echoes, thereby realizing better ghost rejection.

The digital sound and synchronization (DSS) information may result, for example, from QPSK modulation of Dolby Adaptive Modulated (ADM) signals. The data rate for ADM is 408 kilobits, and an additional 32 kilobits per second may be added for synchronization, providing a total bit rate for the DSS packet of 440 kilobits per second. Using QPSK, the channel could accommodate two bits per hertz, which means that the DSS packet would require 0.22 MHz of total bandwidth continuously. Thus, to achieve a desired 4 MHz overall bandwidth, 3.78 MHz is allocated to the augmentation video signals.

After the time expansions, the LD2 signal and panel segment signals of the first line in the cycle are respectively coupled through delay circuits 18 and 20 to emerge therefrom in time coincidence with the LD4 and panel segment signals of the corresponding segments of the third line, respectively. The LD time coincident signals are coupled to quadrature modulator 22, wherein these signals are modulated in quadrature onto a subcarrier signal at a frequency Fc1. Similarly, the panel segment time coincident signals PL1-PL3 and PR1-PR3, are coupled to quadrature modulator 24, wherein these signals are also modulated in quadrature onto the same subcarrier signal utilized for the LD signals. Though two quadrature modulators are shown in FIG. 1, it should be recognized that it is possible too use but one, since the LD and panel signals are provided in different time intervals.

Expanded Yh signals are coupled to a heterodyning circuit 26 wherein the Yh signals are heterodyned with a second subcarrier at a frequency Fc2. The frequency Fc2 is chosen to provide a sideband, as for example, the upper sideband in the same frequency band occupied by the quadrature modulated LD and panel signals.

The DSS signals packet provided by the encoder 10 are not time expanded. These signals are coupled to a heterodyning circuit 28 and heterodyned therein with a third subcarrier signal having a frequency Fc3. The frequency Fc3 is chosen to position the double sideband signal, resulting from the heterodyning process, above and contiguous with the selected sideband of the Yh heterodyning, which for this example is the upper sideband. Selection of the upper sideband of the Yh modulation takes advantage of the natural rolloff of the Yh video signal. Though the upper side has been chosen in the example presented, the selection of the lower sideband is also possible. The lower frequency bound of the Yh signal is probably more energetic than the upper bound. Selection of the lower sideband, however, allows the channel filters to touch the upper bound of the Yh signal. This is more robust and since the effect of the channel filter will not be present on the lower bound of the Yh signal, may allow for better control of the frequency recombination of Yh with the baseband low-frequency component Y1 when reconstructing the total wideband luminance signal.

The quadrature modulated signals from modulators 22 and 24 and the selected sideband from heterodyning circuit 26 are coupled to bandpass filter 30, while the double sideband DSS signal from heterodyning circuit 28 is coupled to bandpass filter 32. These filters limit the bandwidth of the video components to 3.78 MHz and the bandwidth of the DSS packet to 0.22 MHz. The subcarrier frequencies are chosen so that filters 30 and 32 provide contiguous frequency bands to form a total bandwidth of 4 MHz.

Figure 3:
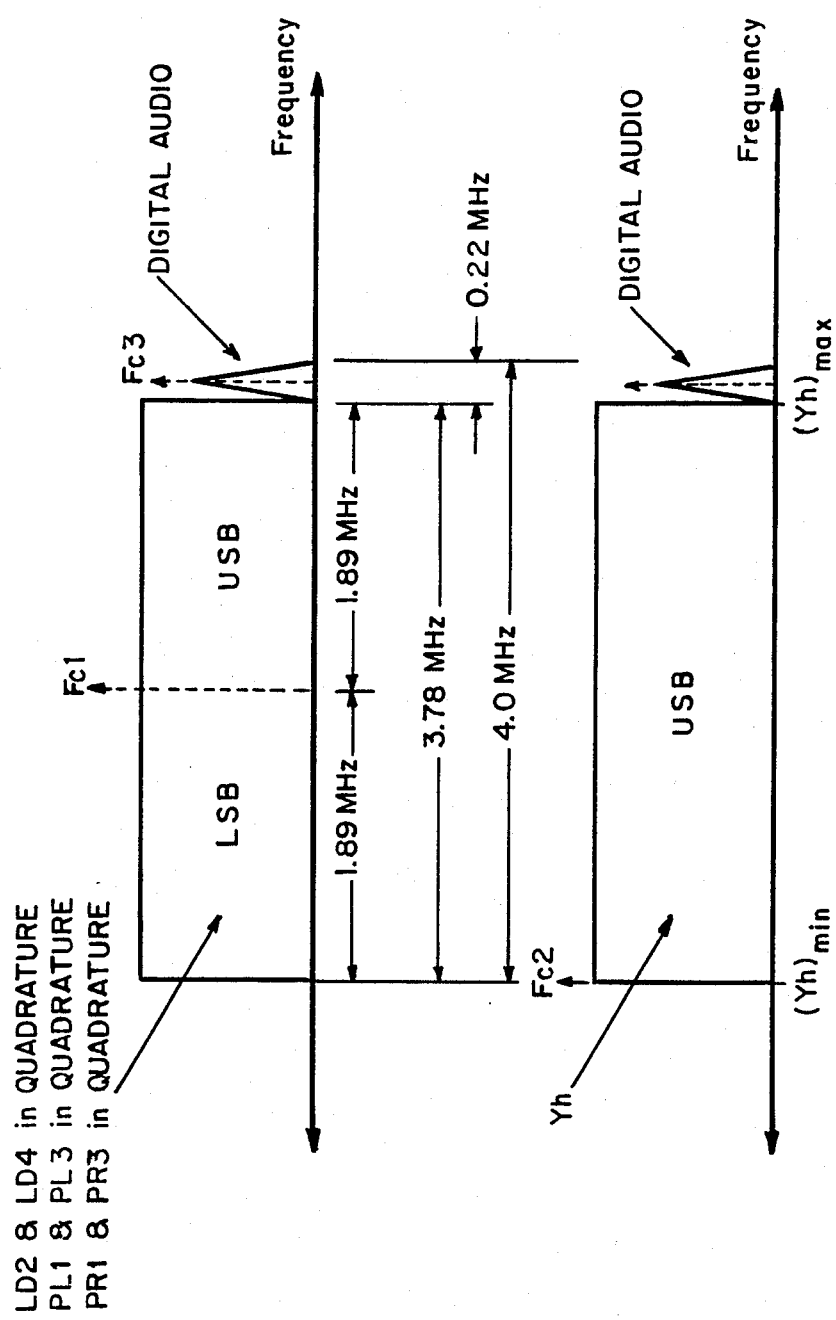
FIG. 3 is a diagram indicating the frequency allocation of the components in a 4 MHz augmentation channel.

After filtering, the signals are arranged in Frequency, as shown in FIG. 3. The quadrature modulated LD and panel signals occupy two side bands about the subcarrier Fc1, each sideband extending over a 1.89 MHz band, the composite sharing a 3.78 MHz band with the upper sideband of the heterodyned Yh signal. Contiguous to the 3.78 MHz band is the 0.22 MHz bandwidth established by the DSS amplitude modulation of the subcarrier Fc3.

Figure 4:
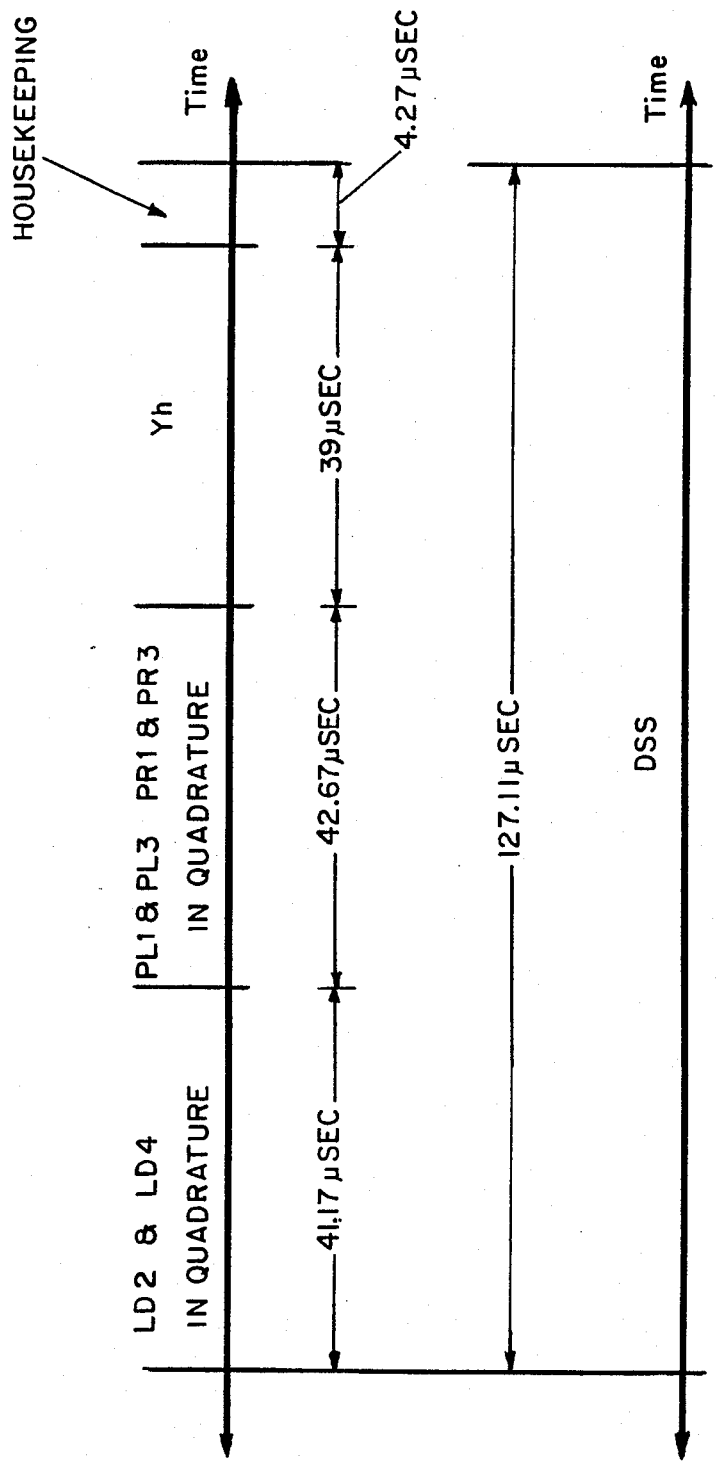
FIG. 4 is a diagram indicating the temporal allocations of the components in a 4 MHz augmentation channel.

The quadrature LD signals, quadrature panel signals, and the Yh selected sideband signals from bandpass filter 30 are coupled along with the amplitude modulated DSS signals from bandpass filter 32 to a multiplexer 34, wherein the signals are formatted and time multiplexed. Multiplexer 34, time arranges the LD signals, which utilize 41.17 usec, the panels signals, which utilize 42.67 usec, and the Yh signal, which utilizes 39 usec, as shown in FIG. 4. Time multiplexed with these three signals are housekeeping signals, which include pilot bursts of the subcarrier reference frequencies for proper phase recovery at the encoder. Housekeeping signals are allotted 4.27 usec. Thus, the time multiplexed signals utilize 127.11 usec, as do the DSS signals. After establishing the time multiplexing, multiplexer 34 formats the signals and combines the time multiplexed signals with the DSS signals from bandpass filter 32 to establish the frequency multiplexing of the time multiplexed and DSS signals.

As described above, time multiplexing of the video signals is performed after bandpass filtering. It should be recognized that the video signals may be time multiplexed after quadrature modulation and heterodyning, then bandpass filtered.

The 4 MHz augmentation channel is assembled in the multiplexer 34 at a selected intermediate frequency (IF) and is coupled therefrom to channel translation circuit 36, wherein it is frequency translated for transmission at a radio frequency (RF). The main HDNTSC 6 MHz channel has not been affected by this signal processing and is also transmitted to allow HDTV reconstruction at the receiver.

Figure 5:
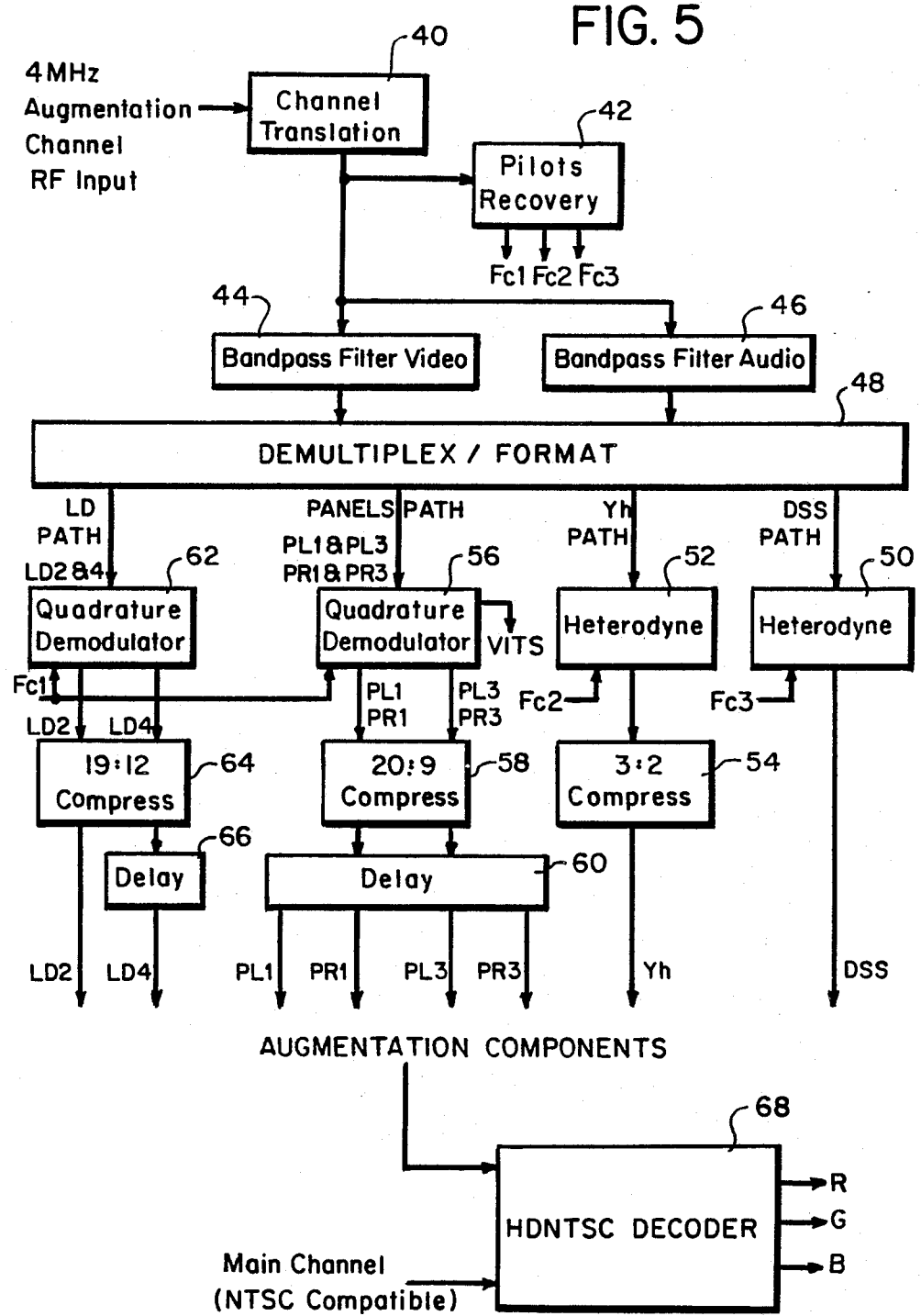
FIG. 5 is a block diagram of a HDNTSC decoder with a 4 MHz augmentation channel.

Referring now to FIG. 5 which is a block diagram of a preferred augmentation channel decoder. The RF signal, modulated with the 4 MHz, augmentation channel, is converted to an IF signal at a predetermined frequency by a channel translator 40. This IF signal is coupled to a pilots recovery circuit 42 wherein the subcarrier signals $F_{c1}$, $F_{c2}$, and $F_{c3}$ are generated to be utilized for the recovery of the video and audio signals. The IF signal is also coupled to a frequency demultiplexer comprising bandpass filter 44, which extracts the video signals, and bandpass filter 46, which extracts the audio signals. The frequency demultiplexed signals are coupled to a time demultiplexer-formator 48 wherein the video signals are time separated and the time demultiplexed video signals and the audio signals are formatted for further processing.

DSS signals from the demultiplexer-formator 48 and the subcarrier $F_{c3}$, generated by the pilots recovery circuit 42, are coupled to heterodyning circuit 50 wherein these signals are heterodyned to recover the DSS signals. This signal provides 440 kilobits per second of continuous data representing ADM audio and digital sync required for the timing circuits.

Similarly, the Yh signal from demultiplexer-formator 48 and the subcarrier $F_{c2}$ are coupled to heterodyning circuit 52 wherein these signals are heterodyned to recover the time expanded Yh signals. The time expanded Yh signals are compressed in a 3:2 time compressor 54 wherefrom the desired Yh signal is provided for addition with the low frequency luminance signal.

Panel signals from the demultiplexer-formator 48 and the subcarrier signal $F_{c1}$, generated by the pilots recovery 42, are coupled to quadrature demodulator 56. The panels signals were quadrature modulated and time multiplexed prior to transmission. PL1 and PL3 were modulated in quadrature followed in time by the quadrature modulation of PR1 and PR3. Consequently, as shown in FIG. 5, one output terminal of quadrature modulator 56 provides PL1 and PR1, while a second output terminal provides PL3 and PR3. PL1 and PL3 appear in time coincidence at the output terminals as do PR1 and PR3. The VITS, which was modulated as part of the original baseband panels at the transmitter, are also demodulated by quadrature demodulator 56 and made available for downstream processing in the HDNTSC decoder.

The demodulated panel signals are coupled to a time compressor 58 wherein a 20:9 compression is applied to remove the expansion factor applied at the transmitter. Compressed panel signals are coupled to delay circuits 60 wherein the panel signals are repositioned to provide the proper order of PL1(first)/PR1/PL3/PR3(last).

LD signals from demultiplexer-formator 48, which are the LD2 and LD4 signals modulated in quadrature, are coupled with the subcarrier signal $F_{c1}$ to a quadrature demodulator 62 wherein the LD2 and LD4 signals are detected and coupled from output terminals of the demodulator 62 to a 19:12 compressor 64 wherefrom the LD2 and LD4 emerge coincident in time. The proper time sequence between LD2 and LD4 is established by delaying LD4 in time delay circuit 66. Though two quadrature demodulators are shown in FIG. 5, as mentioned during description of the encoder, one quadrature detector would suffice for the detection of the LD and panel signals.

The LD, panel, and luminance signals are coupled to an HDNTSC decoder 68 along with the conventional television image signals, wherein the signals are combined to provide high definition television image signals.

While the invention has been described in its preferred embodiments, it is to be understood that the words which have been used are words of description rather than of limitation and that changes within the purview of the appended claims may be made without departure from the true scope and spirit of the invention in its broader aspects.

We claim:

1. A television augmentation apparatus comprising:
    means for generating television augmentation signals including line differential signals, panel signals, and luminance signals and a digital signal including audio and synchronization signals;
    means coupled to said generating means for time expanding said television augmentation signals;
    means coupled to said expanding means for time multiplexing said time expanded line differential signals, said time expanded panel signals, and said time expanded luminance signals, thereby providing a time multiplexed signal comprising said time expanded line differential signals, said time expanded panel signals, and said time expanded luminance signals in respective time intervals; and
    means coupled to said generating means and said time multiplexing means for frequency multiplexing said time multiplexed signal and said digital signal, thereby providing a frequency multiplexed signal comprising said time multiplexed signal in a first frequency band and said digital signal in a second frequency band.

2. The apparatus of claim 1 wherein said time multiplexing means includes modulation means coupled to receive said time expanded line differential signals and said time expanded panel signals for providing quadrature modulated line differential signals and quadrature modulated panel signals.

3. The apparatus of claim 2 wherein said modulation means comprises:
    delay means coupled to said expanding means for positioning time expanded line differential signals in time coincidence, time expanded left panel segments of said panel signals in time coincidence, and time expanded right panel segments of said panel signals in time coincidence; and
    quadrature modulator means coupled to said delay means for quadrature modulating said time expanded line differential signals and for quadrature modulating said time expanded left and right panel segments, thereby providing quadrature modulated signals within a preselected frequency band.

4. The apparatus of claim 3 wherein said time multiplexing means further comprises means coupled to said expanding means for frequency shifiting said time expanded luminance signals to said preselected frequency band.

5. The apparatus of claim 4 wherein said frequency multiplexing means comprises means coupled to said generating means for converting said digital signals to a predetermined frequency band contiguous with said preselected frequency band.

6. The apparatus of claim 5 wherein said preselected frequency band and said predetermined frequency band together encompass a 4 MHz bandwidth.

7. The apparatus of claim 6 wherein the bandwidth of said preselected frequency band is 3.78 MHz and the bandwidth of said predetermined frequency band is 0.22 MHz.

8. The apparatus of claim 5 wherein:
said quadrature modulation of said line differential signals and said quadrature modulation of said panel signals utilize a common first subcarrier signal at a predetermined frequency $F_{c1}$;
said frequency shifting means includes first heterodyning means coupled to receive said time expanded luminance signal and a second subcarrier signal at a preselected frequency $F_{c2}$ for heterodyning said time expanded luminance signal with said second subcarrier to provide a signal having a sideband in said preselected frequency band, thereby shifting said time expanded luminance signal to said preselected frequency band; and
said converting means comprises second heterodyning means coupled to receive said digital signals and a third subcarrier signal at a predetermined frequency $F_{c3}$ for heterodyning said digital signals with said third subcarrier to provide a signal in said predetermined frequency band, thereby shifting said digital signals to said predetermined frequency band contiguous with said preselected frequency band.

9. The apparatus of claim 8 wherein said time expanding means time expands said line differential signals in accordance with a 12:19 ratio, said panels signals in accordance with a 9:20 ratio and said luminance signals in accordance with a 2:3 ratio.

10. A television apparatus comprising:
means for receiving a digital signal converted to a preselected frequency band, frequency multiplexed with a signal having time multiplexed signal components including quadrature modulated time expanded line differential signals, quadrature modulated time expanded panel signals, time expanded luminance signals converted to a predetermined frequency band, and subcarrier pilot signals at frequencies $F_{c1}$, $F_{c2}$, and $F_{c3}$;
means coupled to said receiving means for generating subcarrier signals at frequencies $F_{c1}$, $F_{c2}$, and $F_{c3}$ from said subcarrier pilot signals;
means coupled to said receiving means for demultiplexing said frequency multiplexed signal to obtain said converted digital signal and said time multiplexed signal;
means coupled to received said converted DSS signal and subcarrier signal at frequency $F_{c3}$ for providing said DSS signal;
means coupled to receive said time multiplexed signal for time demultiplexing said time multiplexed signal to provide said time expanded line differential signals, said time expanded panel signals, and said time expanded luminance signals;
means coupled to receive said time expanded line differential signals, said time expanded panel signals, and said subcarrier at frequency $F_{c1}$ for quadrature demodulating said time expanded differential line signals and said time expanded panel signals to obtain time expanded line differential signals and time expanded left and right panel signals;
means coupled to receive said converted time expanded luminance signals and said subcarrier at frequency $F_{c2}$ for providing said time expanded luminance signal;
means coupled to receive said time expanded line differential signals, said time expanded left and right panel signals, and said time expanded luminance signals for compressing said time expanded signals to obtain line differential signals, left and right panel signals, and luminance signals; and
means coupled to receive said line differential signals and said left and right panel signals for providing line differential signals, and left and right panel signals in their original time sequence.

11. A method for providing high definition television comprising the steps of:
receiving line differential signals, left and right panel signals, luminance signals, and a digital signal including audio and synchronization signals:
time expanding said line differential signals, said left and right panel signals, and said luminance signals to obtain time expanded line differential signals, time expanded left and right panel signals, and time expanded luminance signals;
quadrature modulating said time expanded line differential signals and said time expanded left and right panel signals, to obtain quadrature modulated time expanded line differential signals and quadrature modulated time expanded left and right panel signals within a common frequency band;
converting said time expanded luminance signals to said common frequency band;
time multiplexing said quadrature modulated time expanded line differential signals, said quadrature modulated time expanded left and right panel signals, and said time expanded luminance signals to obtain a time multiplexed signal;
converting said DDS signal to occupy a frequency band contiguous with said common frequency band; and
combining said time multiplexed signal and said DSS to establish a frequency multiplexed signal.

12. The method of claim 11 wherein the quadrature modulation step includes the steps of:
delaying a first time expanded line differential signal to be time coincident with a second time expanded line differential signal;
delaying time expanded first left and right panel signals to be time coincident with time expanded second left and right panel signals, respectively;
coupling time coincident time expanded line differential signals and time coincident left and right panel signals to a quadrature modulator to obtain said quadrature modulated time expanded line differential signals and said quadrature time expanded left and right panel signals.

13. An apparatus for providing a frequency multiplexed television signal, said apparatus comprising:
means for generating television image component signals and a digital signal comprising audio and synchronization signals;

means coupled to said generating means for time multiplexing said image component signals with each other, thereby providing a time multiplexed signal within a predetermined bandwidth;

means coupled to said time multiplexing means and said generating means for frequency multiplexing said time multiplexed signal and said digital signal, thereby providing a frequency multiplexed signal comprising said time multiplexed signal within said predetermined bandwidth and said digital signal within a preselected bandwidth, said frequency multiplexed signal having a total bandwidth which is more narrow than the bandwidth of a conventional television channel; and means for transmitting said frequency multiplexed signal.

14. A television augmentation apparatus as set forth in claim 13, further comprising means for receiving said frequency multiplexed signal and generating a television display at least in part in response thereto.

15. A television apparatus comprising:

means for receiving a frequency multiplexed signal having a total bandwidth which is more narrow than the bandwidth of a conventional television channel and which comprises audio and synchronization signals within a preselected bandwidth and image component signals time multiplexed within a predetermined bandwidth;

means coupled to said receiving means for frequency demultiplexing said frequency multiplexed signal for providing said audio and synchronization signals and said time multiplexed image component signals;

means coupled to said frequency demultiplexing means for time demultiplexing said time multiplexed signal to obtain said image component signals;

means coupled to said frequency demultiplexing means and said time demultiplexing means for combining said image component signals to establish TV image signals; and means coupled to said frequency demultiplexing means and said combining means for generating a visual display in response to said TV image signals and accompanying audio in response to said audio signals.

16. Method for generating a television augmentation signal having a total bandwidth which is more narrow than the bandwidth of a conventional television channel and which comprises image component signals and a digital signal including audio and synchronization signals, comprising the steps of:

time multiplexing said image component signals to create a time multiplexed signal having a predetermined bandwidth;

frequency multiplexing said time multiplexed signal and said digital signal, thereby creating a frequency multiplexed signal comprising said time multiplexed signal within said predetermined bandwidth and said digital signal within a preselected bandwidth; and transmitting said frequency multiplexed signal.

17. A method as set forth in claim 16, wherein said transmitting step comprises recording said frequency multiplexed signal.

* * * * *